United States Patent
Hildebrandt

[11] 3,917,897
[45] Nov. 4, 1975

[54] LOW TEMPERATURE CABLE SYSTEM AND METHOD FOR COOLING SAME

[75] Inventor: Ullrich Hildebrandt, Munich, Germany

[73] Assignee: Linde Aktiengesellschaft, Wiesbaden, Germany

[22] Filed: Oct. 22, 1974

[21] Appl. No.: 517,013

[30] Foreign Application Priority Data
Oct. 25, 1973 Germany.......................... 2353536

[52] U.S. Cl............................ 174/15 C; 174/DIG. 6
[51] Int. Cl.²........................................... H01B 7/34
[58] Field of Search........... 174/15 R, 15 C, DIG. 6, 174/126 CP, 128; 335/216

[56] References Cited
UNITED STATES PATENTS

| | | | |
|---|---|---|---|
| 3,686,422 | 8/1972 | Doose | 174/DIG. 6 |
| 3,697,665 | 10/1972 | Doose et al. | 174/DIG. 6 |
| 3,749,811 | 7/1973 | Bogner et al. | 174/DIG. 6 |
| 3,800,062 | 3/1974 | Kataoka et al. | 174/DIG. 6 |
| 3,835,239 | 9/1974 | Schmidt et al. | 174/DIG. 6 |
| 3,849,589 | 11/1974 | Schmidt et al. | 174/DIG. 6 |

*Primary Examiner*—Arthur T. Grimley
*Attorney, Agent, or Firm*—Karl F. Ross; Herbert Dubno

[57] ABSTRACT

A method of cooling a low-temperature cable system having three conductors each surrounded by a radiation shield. A first coolant, e.g., helium at a temperature of about 4.5°K and a pressure of about 8 Bars, is fed to the cooling ducts of two of the conductors and is then split into two parts, one of which is returned to the plant through the duct of the other conductor. The other part is fed to the passages associated with the radiation shields for mixture with a second coolant, e.g., helium at a temperature of about 60°K and a pressure of about 8 Bars, which is supplied to the passages and, after mixing with the second part of the first coolant, is returned to the cooling plant.

10 Claims, 3 Drawing Figures

LOW TEMPERATURE CABLE SYSTEM AND METHOD FOR COOLING SAME

CROSS REFERENCE TO RELATED APPLICATIONS

This application is related to my copending applications Ser. No. 404,681 filed Oct. 9, 1973, and Ser. No. 386,610 filed Aug. 8, 1973.

FIELD OF THE INVENTION

The present invention relates to a method of cooling a low-temperature, e.g., superconductive, cable or conductor system and to a system as cooled by this method.

BACKGROUND OF THE INVENTION

With the development of more efficient superconductors and the need for the delivery of high electrical currents, there has been increasing interest in low-temperature cable and conductor systems whereby the electrical conductors are cooled by cryogenic fluids, e.g., liquid helium or other liquified gases, or gases or liquids at temperatures below, say, 100°C. The systems may include a superconductor running through or formed on a duct which is traversed by liquid helium and comprises in part an arrangement of coaxial pipes.

The superconductor is usually spacedly surrounded by a radiation shield which in turn, may be cooled, and can be enclosed in an outer casing which may be evacuated. One of the annular spaces around the radiation shield may be filled with so called super-insulation, e.g., alternate layers of porous material and reflective material. The principles of such conduit arrangements have been described in the aforementioned applications and the art of record therein.

When the low-temperature cable comprises a central duct through which liquid helium is passed and the electrical conductor is wound in a plurality of helical bands on the surface of the inner duct, the system is found to be highly effective and to have the requisite degree of flexibility.

Since the cooled conductor must be shielded against the ambient temperature and electrically insulated from the environment, it is the practice as noted above to provide an annular passage for a liquid or gas coolant serving as or for the radiation shield. Another chamber can be evacuated and filled with superinsulation and still a further casing may be provided for corrosion protection.

The spacing between the individual layers in the conductor system may be maintained by spacer elements or support rings. The coolant in the radiation shield should have a temperature of up to 120°K and it has been the practice heretofore to use liquid or gaseous nitrogen as the radiation shield or helium which is passed out of the superconductor duct.

Most of the cables used heretofore have been provided for three-phase alternating current or the like so that, in general, three conductors are required. The system is also generally divided into lengths, each of which may have a respective cooling plant located at stations along the system. The lengths may be isolated from one another, so that in the event of failure of one fluid system, the remaining systems will remain in tact.

Even with conductor arrangements of the type described, it has been found that a uniform and effective cooling of the cable system, especially where three conductors with respective radiation shields are employed, cannot be obtained.

OBJECT OF THE INVENTION

It is the principal object of the invention to provide a method of cooling a low-temperature conductor system having three conductors whereby these disadvantages are obviated.

SUMMARY OF THE INVENTION

This object is attained, in accordance with the invention, by deriving two coolant streams from the cooling plant of each length of the coolant system and passing the lower-temperature stream, e.g., helium at a temperature of about 4.5°K and a pressure of about 8 Bars, through two of the ducts associated with the conductors and subdividing this stream into a first and second part. The first part is returned to the cooling plant through the other duct while the second part is combined with the second cooling stream from the plant and used to cool the radiation shield or to constitute the latter. For this purpose, each of the radiation shields is provided with a passage surrounding the respective conductor and cooled at least in part by the second coolant stream which is mixed with the second part of the first stream.

This is an important advantage of the present invention that only a single coolant, e.g., helium in a liquid or gaseous state, is required and can be derived from the cooling plant without difficulty in two cooling streams with customarily different temperatures. While only two streams are derived from the plants, three conductors may be cooled particularly uniformly and this is especially important for superconductors which can be provided in independent duct systems or in a common duct system with corresponding spacing elements. Both cable systems can be uniformly cooled with the technique of the present invention.

Another advantage of the present system is that only one of the two coolant streams, i.e., the so called first coolant stream, must be cooled to the extremely low temperature which should be maintained on the conductor. After the first coolant has been used in this manner, a portion of it is mixed with the second coolant and is employed to maintain the low temperature of this stream which cools or constitutes the radiation shields.

The coolant streams for cooling the three conductors can be made equal without special care with regard to the flow cross section of the individual streams through each duct and, in combination therewith, the present system for cooling the radiation shield has been found to greatly increase the lengths of cable which can be serviced by a given plant and hence the spacing between plants.

Advantageously, the second coolant flows through one of the three radiation shields in counterflow to the second part of the first coolant and through the other two radiation shields or passages in the same direction as the second part of the first coolant introduced into the latter. It has been found that this system ensures that at each point in the cable system the mass flow in one direction of the coolant is equal to the mass flow in the opposite direction.

The system has been found to be effective for other low-temperature cables in addition to superconductors.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 3:
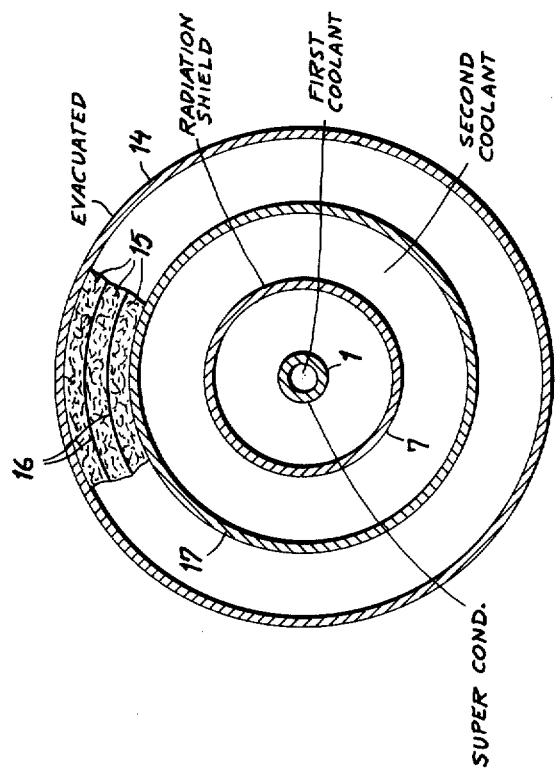
FIG. 3 is a section taken along the line III — III of FIG. 2.

In a superconductor cable system according to the invention, the superconductor may be wound in helical strips around a duct 1 which (FIGS. 2 – 3) is traversed by the first coolant and coaxially surrounded by a pipe 7 forming one wall of a radiation shield whose other wall 17 defines with the first wall a passage for the second coolant. This passage is represented diagrammatically at 7 in FIG. 1. The space between duct 1 and shield 7, 17 may be evacuated and filled with superinsulation.

An outer casing 14 surrounds the duct 17 and defines an evacuated space therewith which is filled with superinsulation consisting of alternating layers 15 of glass fibers or like porous material and reflective layers 16, e.g., of aluminum foil. The entire duct system shown in FIGS. 2 and 3 may be enclosed within still another casing, also evacuated and filled with thermal insulation and provided internally with spacers holding the individual ducts systems for the three conductors in spaced relation.

Figure 1:
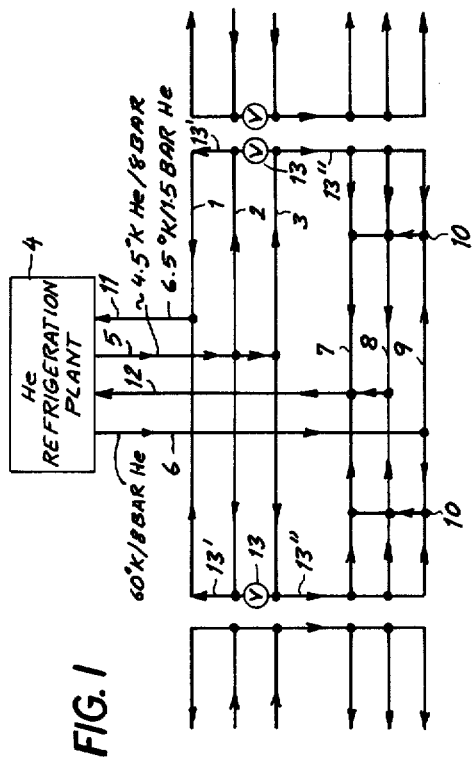
FIG. 1 is a flow diagram illustrating the method of the present invention.
Figure 2:
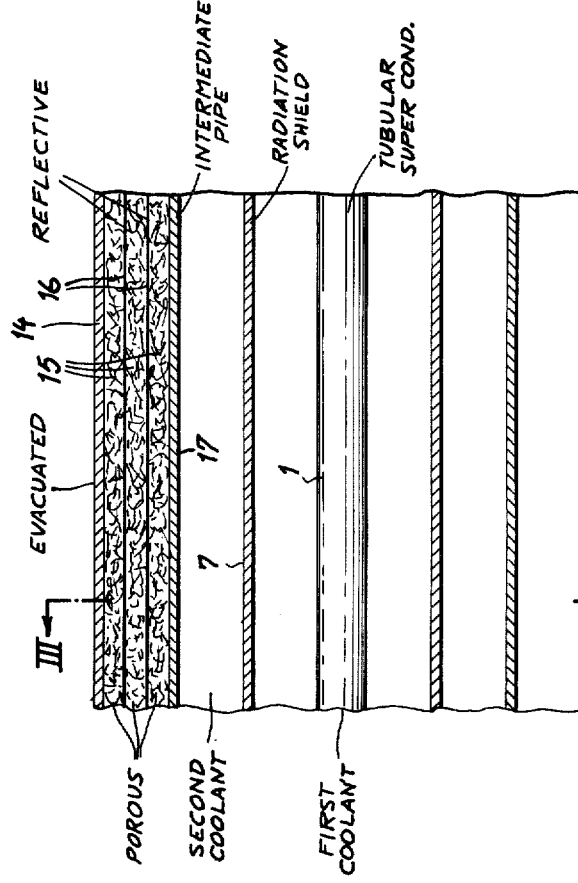
FIG. 2 is an axial section through part of the cable of one conductor.

In FIG. 1 each of the three conductors is represented as a conductor duct 1, 2, or 3 and is associated with a respective radiation shield, 7, 8, or 9. A cooling plant 4 services the individual length of cable and has supplied conduits 5 and 6 of the first and second streams respectively and respective return conduits 11 and 12. Valved bypasses 13 control the portions of the first part and second part of the first cooling, respectively, while connections 10 inwardly of the ends of the passages 7 - 9 operate to conduct the second part of the first coolant into admixture with the second coolant.

Low-temperature helium from the cooling plant 4 flows via conduit 5 into the second conductor duct 2 and the third conductor duct 3 at a temperature of about 4.5°K and a pressure of 8 Bars.

All or most of the first coolant traversing the duct 2 is passed at 13' into the first conductor duct at and is led directly from the system to the plant by return conduit 11 at a temperature of about 6.5°K and a pressure of about 1.5 Bars. This is the first part of the first coolant.

The second part of the first coolant, in an amount determined by the flow cross section of the valve can be bypassed at 13 to the radiation shield passages. Thus all or part of the first coolant traversing the duct 3, flows at 13" into the ends of all three radiation shield passage, 7, 8, and 9. Preferably all of the flow from duct 2 traverses duct 1 and at least half of the flow from duct 3 is diverted to the passages 7, 8, and 9.

This second part of the first coolant flows to a pair of intermediate connections 10 where it mixes with the second coolant supplied to the third passage 9 by the duct at a temperature of 60°K and a pressure of about 8 Bars. The mixture then is returned via line 12 to the cooling part.

I claim:

1. A method of cooling a lower-temperature cable system comprising three electrical conductors each surrounded by a radiation shield and having a respective duct for conducting a low-temperature coolant in cooling relationship with the respective conductor and a respective flow passage for conducting a low-temperature coolant for each radiation shield, said other system having a cooling plant for said coolant, said method comprising the steps of:
   a. passing a first coolant from said plant through said ducts to cool said conductors;
   b. returning a first part of the first coolant traversing said ducts directly to said plant;
   c. passing a second coolant from said plant through at least a portion of said passages to cool said radiation shields and returning said second coolant in a stream to said plant; and
   d. bypassing a second part of the first coolant to said stream of second coolant in mixture therewith prior to its return to said plant.

2. The method defined in claim 1 wherein the second part of the first coolant is passed in step (d) through the remaining portions of said passages prior to being mixed with said second coolant.

3. The method defined in claim 2 wherein the portion of said passages traversed by said second coolant in step (c) is the portion intermediate the opposite ends of said passages and the portion of the passages traversed by said second part of said first coolant are end portions of said passages.

4. The method defined in claim 1 wherein the first coolant in step (a) is fed into two of said ducts and is thereafter split into said first and second parts, said first part being returned to said plant through the other of said ducts.

5. The method defined in claim 4 wherein all of the first coolant traversing one of said two ducts is constituted as said first part and is returned to said plant through said other duct, while all of the first coolant traversing the other of said two ducts is constituted as said second part and is mixed with said second coolant.

6. The method defined in claim 4 wherein one of said passages is fed with said second coolant at a location intermediate the ends thereof, and said stream is returned to said plant from another of said passages at a location intermediate its ends, said second part of said first coolant is fed into all three of said passages at their ends, and said passages are in fluid communication at two spaced-apart locations flanking said intermediate locations and inwardly of the ends of the passages.

7. The method defined in claim 6 wherein said one of said passages is traversed by said second coolant in a direction opposite to that in which it is traversed by said second part of said first coolant.

8. The method defined in claim 7 wherein the others of said passages are traversed by said second coolant in a direction identical to that in which they are traversed by said second part of said first coolant.

9. The method defined in claim 8 wherein said first coolant is helium supplied to said tube of said ducts at a temperature of about 4.5°K and a pressure of about 8 Bars and returned from the other duct at a temperature of about 6.5°K and a pressure of about 1.5 Bar, said second coolant being helium supplied to said passages at a temperature of about 60°K and a pressure of about 8 Bars.

10. A low temperature cable system comprising a succession of cable lengths, each of said lengths having three electrical conductors, means defining a duct for a coolant in heat-exchanging relationship with each conductor, a radiation shield spacedly surrounding each conductor means defining a passageway for a coolant in heat-exchanging relationship with each radiation shield; a cooling plant for each of said lengths for cooling the respective coolants; means for passing a first coolant from each of said plants into two of said ducts at a location intermediate the ends thereof; means for connecting one of said two ducts of each length to the other duct thereof at the opposite ends of the respective lengths for returning said first coolant through said other duct, means for connecting said other duct of each length to the respective plant for returning a first part of said first coolant directly thereto; means connecting the other of said two ducts to said passages at the ends thereof for feeding a second part of said first coolant thereto; means connecting said plant to one of the passages of the respective length at a location intermediate its ends by supplying a second coolant to said one of said passages; means connecting another of said passages to the respective plant at a location intermediate the ends of said length for returning said second coolant to said plant; and means interconnecting all of said passages of a respective length at locations on opposite sides of said intermediate locations and spaced inwardly from the ends thereof.

* * * * *